US011524344B2

(12) United States Patent
Hecht

(10) Patent No.: US 11,524,344 B2
(45) Date of Patent: Dec. 13, 2022

(54) ROTATIONALLY ASYMMETRIC CUTTING INSERT HAVING A SINGLE RADIALLY EXTENDING CUTTING-EDGE PORTION AND ROTARY CUTTING TOOL

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 242 days.

(21) Appl. No.: 16/855,639

(22) Filed: Apr. 22, 2020

(65) Prior Publication Data

US 2021/0331256 A1    Oct. 28, 2021

(51) Int. Cl.
*B23B 51/00* (2006.01)
*B23B 51/06* (2006.01)

(52) U.S. Cl.
CPC .......... *B23B 51/0007* (2022.01); *B23B 51/00* (2013.01); *B23B 51/066* (2022.01)

(58) Field of Classification Search
CPC ..... B23B 51/00; B23B 51/063; B23B 51/066; B23B 27/145; B23B 2200/0423; B23B 2200/0457; B23B 2251/50; B23B 51/0493; B23B 2251/02; B23B 2251/201
See application file for complete search history.

(56) References Cited

U.S. PATENT DOCUMENTS

| | | | |
|---|---|---|---|
| 3,422,706 A * | 1/1969 | Lunsford | B23B 51/00 407/34 |
| 3,776,656 A | 12/1973 | Benjanin | |
| 4,212,569 A * | 7/1980 | Andersson | B23B 51/0486 408/59 |
| 4,437,802 A * | 3/1984 | Hall, Jr. | B23B 51/0493 407/36 |

(Continued)

FOREIGN PATENT DOCUMENTS

DE    10 2018 001056    8/2019
JP       2002355711 A  * 12/2002

OTHER PUBLICATIONS

International Search Report dated Jul. 19, 2021, issued in PCT counterpart application (No. PCT/IL2021/050375).

(Continued)

*Primary Examiner* — Eric A. Gates
*Assistant Examiner* — Paul M Janeski
(74) *Attorney, Agent, or Firm* — Womble Bond Dickinson (US) LLP

(57) ABSTRACT

A cutting insert rotatable about an axis, has opposing front and rear surfaces interconnected by an insert peripheral surface, the insert peripheral surface having first and second side surfaces spaced apart by first and second land surfaces. First and second land edges extend along the first and second land surfaces, respectively. A first front edge formed at the intersection of the front surface and the first side surface includes a cutting-edge portion, and a second front edge (Continued)

formed at the intersection of the front surface and the second side surface is devoid of a cutting-edge portion. A cutting profile formed by rotating the cutting-edge portion about the axis is located axially forward of the second front edge. The cutting insert is releasably secured to a tool shank, the cutting insert being located between two protuberances protruding from a forward end portion of the tool shank.

24 Claims, 6 Drawing Sheets

(56) References Cited

U.S. PATENT DOCUMENTS

| | | | |
|---|---|---|---|
| 4,813,824 | A | 3/1989 | Grunsky |
| 4,854,789 | A | 8/1989 | Evseanko, Jr. |
| 7,195,428 | B2 | 3/2007 | Astakhov et al. |
| 7,296,953 | B2 | 11/2007 | Kuenzel |
| 7,393,162 | B2 | 7/2008 | Hecht |
| 2001/0026738 | A1 | 10/2001 | Kojima |
| 2004/0175245 | A1* | 9/2004 | Takiguchi ............... B23B 51/02 408/230 |
| 2005/0196244 | A1* | 9/2005 | Takiguchi ............... B23B 51/06 408/231 |

OTHER PUBLICATIONS

Written Opinion dated Jul. 19, 2021, issued in PCT counterpart application (No. PCT/IL2021/050375).

* cited by examiner

ROTATIONALLY ASYMMETRIC CUTTING INSERT HAVING A SINGLE RADIALLY EXTENDING CUTTING-EDGE PORTION AND ROTARY CUTTING TOOL

FIELD OF THE INVENTION

The present invention relates to a cutting insert rotatable about an insert axis having a single radially extending cutting-edge portion and a rotary cutting tool having such cutting insert, for use in metal cutting processes in general, and for drilling operations in particular.

BACKGROUND OF THE INVENTION

Within the field of cutting tools used in drilling operations, there are many examples of rotary cutting tools with cutting heads, plates or tips having a single radially extending cutting-edge portion, some of which are brazed or welded to a shank and some of which are removably replaceable.

U.S. Pat. No. 7,195,428 discloses a cutting tip bounded by an imaginary cylinder corresponding to the size of the hole being drilled, having a generally V-shaped tip flute extending the full length thereof. The cutting tip is secured to the end of a shank by brazing or welding in a conventional manner so that tip flute is generally aligned with a shank flute. A pair of raised narrow axial elongate wear pads are spaced about the periphery of the cutting tip, extending longitudinally, and raised slightly relative to the adjacent cylindrical surface of the cutting tip.

U.S. Pat. No. 7,296,953 discloses a deep hole drill comprising a cutter carrier, a replaceable cutting insert and at least one replaceable guide strip. The cutter carrier, in the form of a drill head, has a recess with its rear surface and two side surfaces forming a seat for the replaceable cutting plate. A central threaded hole in the rear surface receives a screw guided through a through hole in the replaceable cutting plate. At the axial height of the replaceable cutting plate seat, recesses for guide strips are provided over the circumference of the drill, each guide strip abutting against a stop surface in the respective recess, and each stop surface having a central threaded hole for screwing the respective guide strip.

U.S. Pat. No. 7,393,162 discloses a gun-drill comprises a cutting-head detachably secured to a shank, having a common longitudinal axis and comprising mating peripheral surfaces. A shank coupling portion comprising a forwardly tapering shank fixation surface is formed at a front end of the shank, and a cutting-head coupling portion comprising a forwardly tapering cutting-head fixation surface is formed at a rear end of the cutting-head. Both the shank and the cutting-head coupling portion extend over a peripheral coupling angle of more than 180 degrees. The shank and the cutting-head are assembled by positioning the cutting-head leading face in front of the shank trailing face, slidably inserting the cutting-head coupling portion into the shank coupling portion laterally to the axis of rotation and rotating the cutting-head relative to the shank in a direction opposed to the direction of rotation so that the cutting-head coupling portion and the shank coupling portion interlock co-axially.

SUMMARY OF THE INVENTION

In accordance with the present invention, there is provided a rotationally asymmetric cutting insert rotatable about an insert axis in a direction of cutting rotation, the insert axis defining an insert forward-rearward direction, the cutting insert comprising;
    opposing front and rear surfaces interconnected by an insert peripheral surface, the insert peripheral surface having first and second side surfaces spaced apart by first and second land surfaces,
    a first land edge extending rearwardly from the front surface along the first land surface,
    a second land edge extending rearwardly from the front surface along the second land surface;
    a first front edge formed at the intersection of the front surface and the first side surface, the first front edge including a radially extending cutting-edge portion; and
    a second front edge formed at the intersection of the front surface and the second side surface, the second front edge being devoid of a cutting-edge portion,
    wherein:
    the first side surface includes a rake surface adjacent the cutting-edge portion, the rake surface facing in the direction of cutting rotation;
    the first and second land edges are contained in an envelope surface of an imaginary first cylinder having a circular cross-section and a cylinder axis coaxial with the insert axis, the imaginary first cylinder having a first diameter, and
    an imaginary cutting profile formed by rotating the cutting-edge portion 360 degrees about the insert axis is located axially forward of the second front edge and defines a cutting diameter which corresponds to the first diameter.

Also, in accordance with the present invention, there is provided a rotary cutting tool comprising:
    a tool shank extending along a shank axis defining a shank forward-rearward direction, the tool shank comprising spaced apart first and second protuberances protruding from a forward end portion thereof and an insert receiving slot located between the first and second protuberances; and
    a rotationally asymmetric cutting insert of the sort described above releasably secured to the tool shank in the insert receiving slot,
    wherein:
    the insert axis is coaxial with the shank axis; and
    the insert's front surface faces in the shank forward direction.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
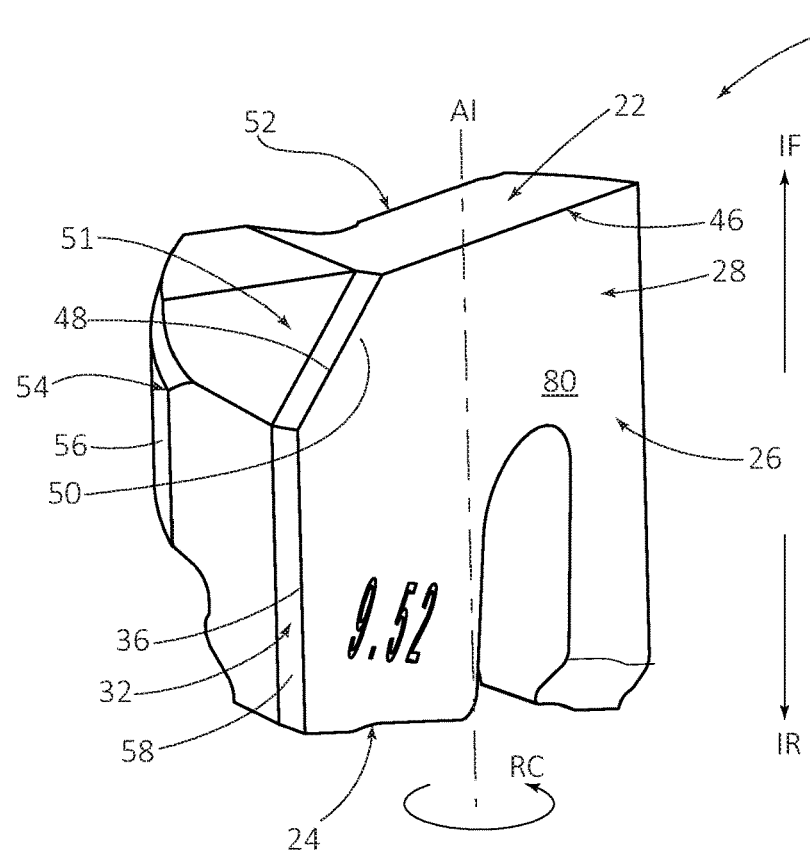
FIG. 1 is a perspective view of a cutting insert in accordance with some embodiments of the present invention.

A first aspect of the present invention relates to a cutting insert 20 having opposing front and rear surfaces 22, 24 interconnected by an insert peripheral surface 26, and an insert axis AI defining an insert forward-rearward direction IF, IR.

As shown in FIGS. 1 to 6, the cutting insert 20 is rotatable about the insert axis AI in a direction of cutting rotation RC, and the insert peripheral surface 26 has opposing first and second side surfaces 28, 30 spaced apart by first and second land surfaces 32, 34. The cutting insert 20 is rotationally asymmetric about the insert axis AI (except for rotations that are multiples of 360 degrees).

In some embodiments of the present invention, the cutting insert 20 may preferably be manufactured by form pressing and sintering a cemented carbide, such as tungsten carbide, and may be coated or uncoated.

Also, in some embodiments of the present invention, the cutting insert 20 may be of unitary one-piece construction.

As shown in FIGS. 1 to 6, a first land edge 36 extends rearwardly from the front surface 22 along the first land surface 32, and a second land edge 38 extends rearwardly from the front surface 22 along the second land surface 34.

Figure 2:
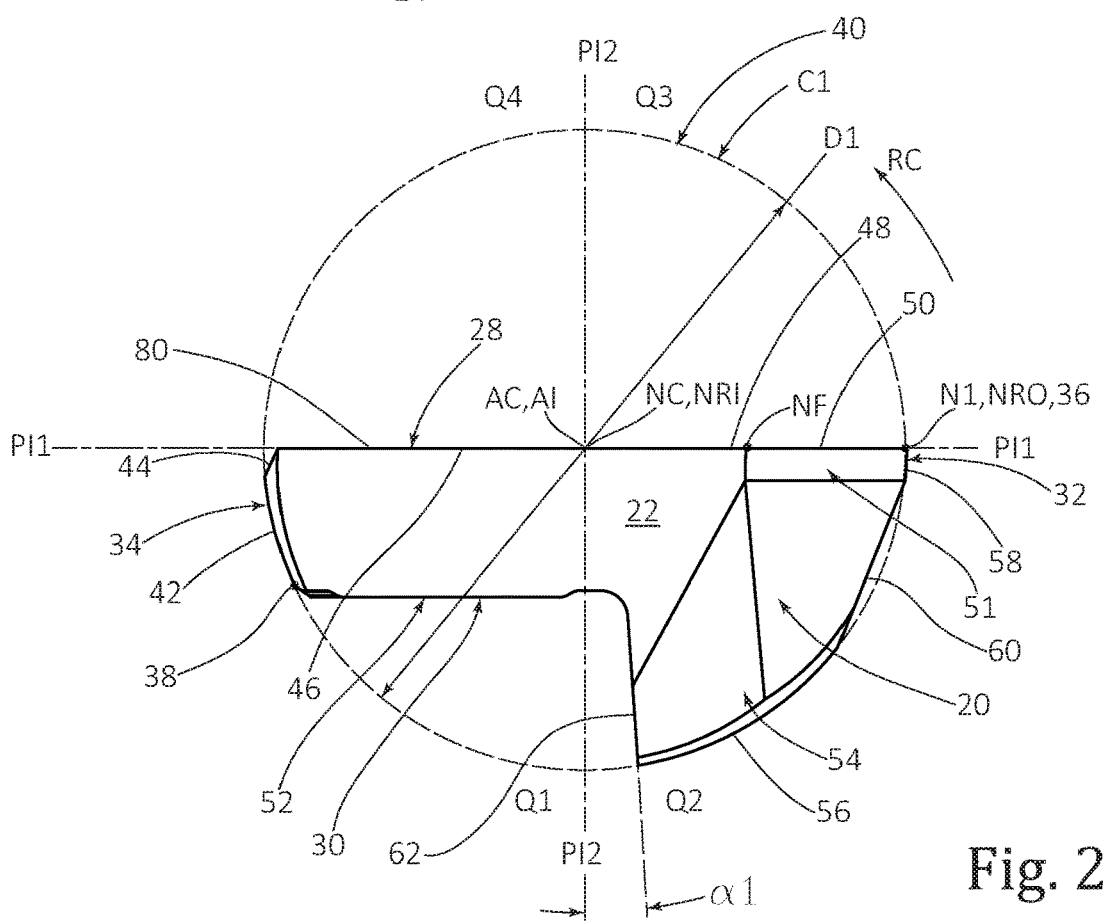
FIG. 2 is a front view of the cutting insert shown in FIG. 1.

As shown in FIG. 2, the first and second land edges 36, 38 are contained in an envelope surface 40 of an imaginary first cylinder C1 having a circular cross-section and a cylinder axis AC coaxial with the insert axis AI, the imaginary first cylinder C1 having a first diameter D1.

It should be appreciated throughout the description and claims that the imaginary first cylinder C1 may undergo minute axial tapering in the rearward direction IR such that the first diameter D1 is reduced by up to 0.01 mm along the length of the first land edge 36.

In some embodiments of the present invention, the first land edge 36 may be formed at the intersection of the first side surface 28 and the first land surface 32, and the second land edge 38 may be formed at the intersection of the second side surface 30 and the second land surface 34.

Figure 3:
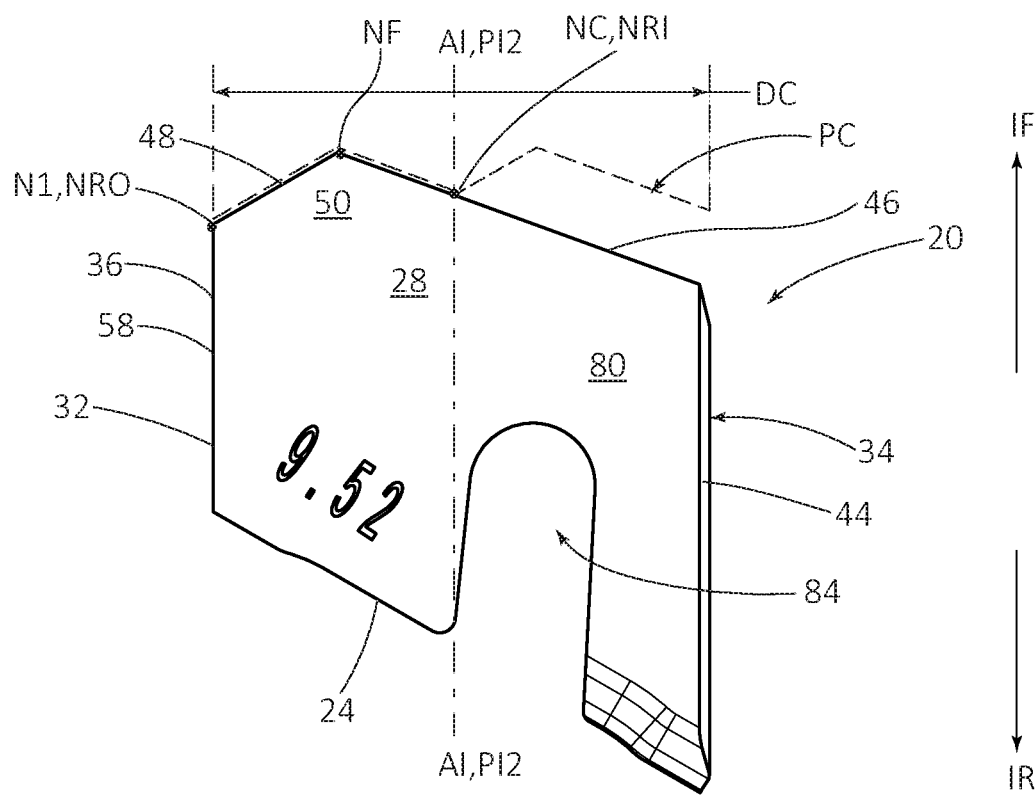
FIG. 3 is a first side view the cutting insert shown in FIG. 1.
Figure 5:
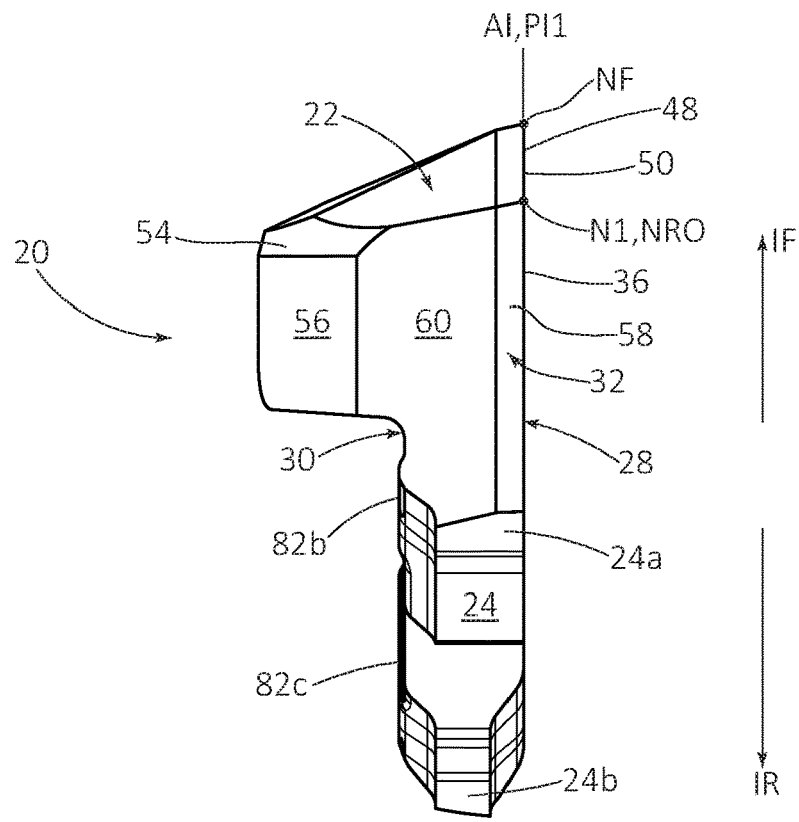
FIG. 5 is a third side view the cutting insert shown in FIG. 1.

As shown in FIGS. 3 and 5, the first land edge 36 extends rearwardly from a first end point N1. And since the first land edge 36 is (i) formed at the intersection of the first side surface 28 and the first land surface 32 and (ii) also extends rearwardly from the front surface 22 along the first land surface 32, the first end point N1 is located on all three (and thus at the intersection) of the front surface 22, the first side surface 28 and the first land surface 32.

In some embodiments of the present invention, as shown in FIG. 2, the first end point N1 and the insert axis AI may be contained in a first insert plane PI1.

Also, in some embodiments of the present invention, the first land edge 36 may be straight and parallel to the insert axis AI.

Further, in some embodiments of the present invention, the first land edge 36 may intersect the rear surface 24.

Figure 6:
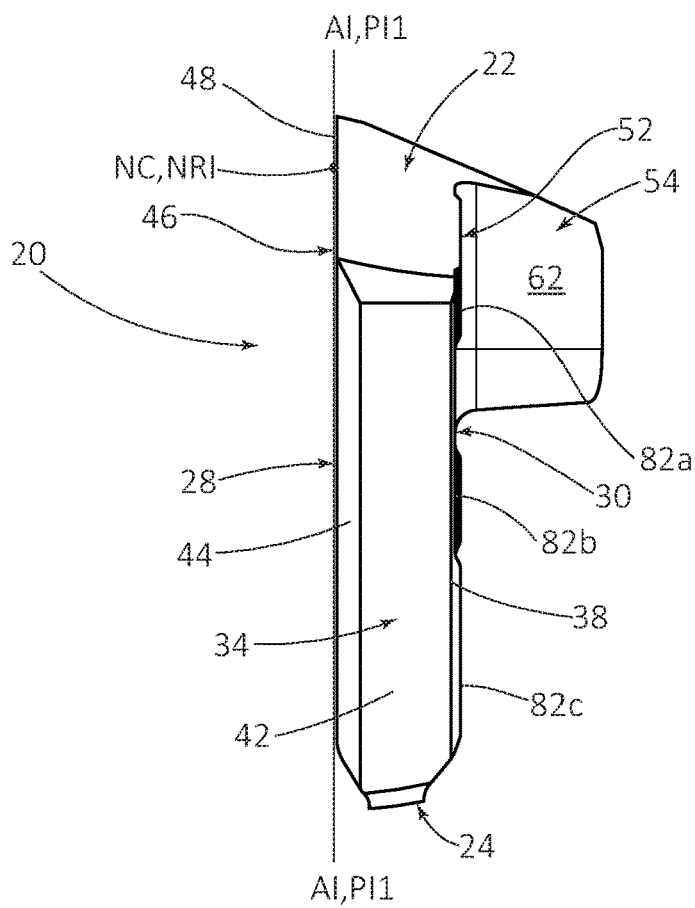
FIG. 6 is a fourth side view the cutting insert shown in FIG. 1.

As shown in FIGS. 2 and 6, the second land surface 34 may include a first support surface 42 contained in the envelope surface 40 of the imaginary first cylinder C1.

In some embodiments of the present invention, the first support surface 42 may circumferentially extend from the second land edge 38 in the direction opposite to the direction of cutting rotation RC.

As shown in FIG. 2, the first support surface 42 may be entirely located in a first imaginary quadrant Q1 of four imaginary quadrants Q1, Q2, Q3, Q4 defined by the first insert plane PI1 intersecting a second insert plane PI2 perpendicular thereto and containing the insert axis AI.

In some embodiments of the present invention, the first support surface 42 may intersect the front surface 22.

Also, in some embodiments of the present invention, the first support surface 42 may intersect the rear surface 24.

As shown in FIGS. 2 and 6, the first support surface 42 may be spaced apart from the first side surface 28 by a first intermediate surface 44.

In some embodiments of the present invention, the first intermediate surface 44 may be located radially inward of the envelope surface 40 of the imaginary first cylinder C1.

Also, in some embodiments of the present invention, the first intermediate surface 44 may be planar, in the form of an axially extending chamfer.

As shown in FIGS. 1 to 6, a first front edge 46 is formed at the intersection of the front surface 22 and the first side surface 28, and the first front edge 46 includes a radially extending cutting-edge portion 48.

In some embodiments of the present invention, the cutting-edge portion 48 may extend radially outwardly to the first land edge 36.

As shown in FIG. 2, the cutting-edge portion 48 may have a radially outermost cutting point NRO contained in the envelope surface 40 of the imaginary first cylinder C1.

It should be appreciated that in some embodiments of the present invention, the radially outermost cutting point NRO may be coincident with the first end point N1 of the first land edge 36.

As shown in FIGS. 1 to 3, the first side surface 28 includes a rake surface 50 adjacent the cutting-edge portion 48, facing in the direction of cutting rotation RC.

In some embodiments of the present invention, the rake surface 50 may be a planar sub-surface of the first side surface 28.

In other embodiments of the present invention (not shown), the rake surface 50 may include a recess or a plurality of recesses in the first side surface 28.

Figure 4:
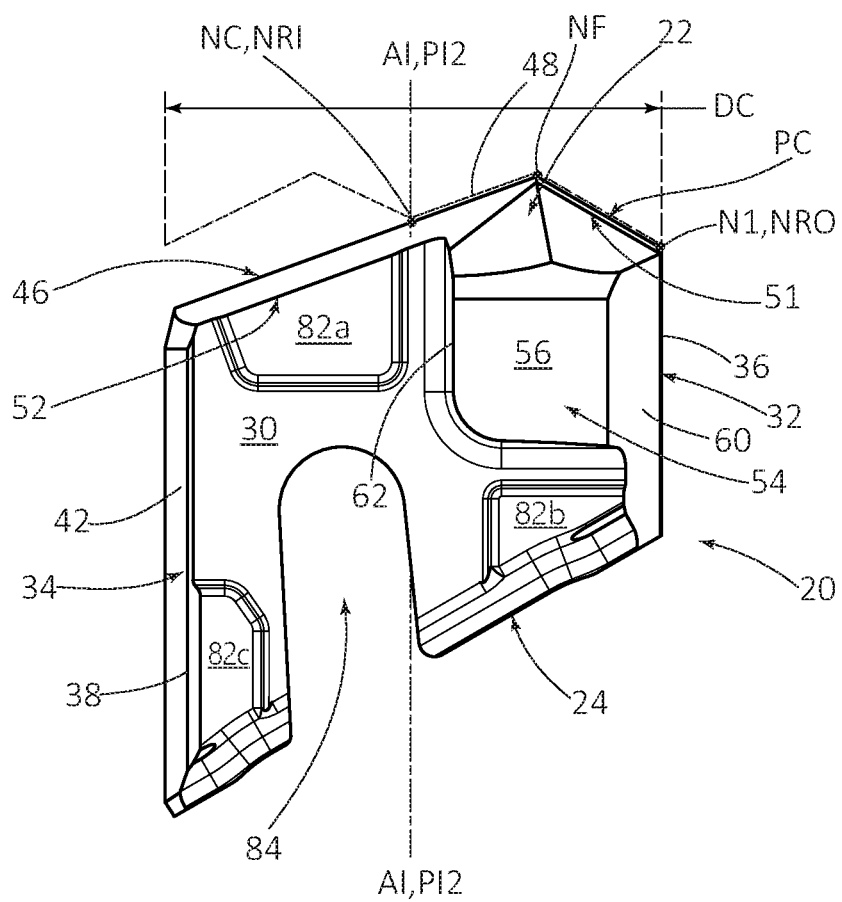
FIG. 4 is a second side view the cutting insert shown in FIG. 1.

As shown in FIGS. 1, 2 and 4, the front surface 22 includes a relief surface 51 adjacent the cutting-edge portion 48.

In some embodiments of the present invention, the relief surface 51 may be multi-faceted.

According to the present invention, a second front edge 52 is formed at the intersection of the front surface 22 and the second side surface 30, and the second front edge 52 is devoid of a cutting-edge portion.

In view of the first front edge 46 having a radially extending cutting-edge portion 48, and the second front edge 52 being devoid of a cutting-edge portion, the cutting insert 20 may be termed as having a single radially extending cutting-edge portion.

As shown in FIGS. 1 to 6, the cutting insert 20 may not exhibit rotational symmetry about the insert axis AI. As such, the cutting insert 20 is considered to be rotationally asymmetric about the insert axis AI.

As shown in FIGS. 3 and 4, an imaginary cutting profile PC formed by rotating the cutting-edge portion 48 360 degrees about the insert axis AI is located axially forward of the entire second front edge 52.

It should be appreciated throughout the description and claims, that the relative axial position of the second front edge 52 with respect to the imaginary cutting profile PC, is considered at equivalent radial extents of the second front edge 52 and the imaginary cutting profile PC from the insert axis AI.

In some embodiments of the present invention, the imaginary cutting profile PC may be located axially forward of any edge associated with the front surface 22, apart from the cutting-edge portion 48 itself, which defines the imaginary cutting profile PC.

Also, in some embodiments of the present invention, the imaginary cutting profile PC may define a cutting diameter DC corresponding to the first diameter D1.

Further, in some embodiments of the present invention, the cutting-edge portion 48 may extend radially outwardly from the insert axis AI.

As shown in FIGS. 2 to 4, the cutting-edge portion 48 may have a radially innermost cutting point NRI coincident with the insert axis AI.

It should be appreciated that in some embodiments of the present invention, the radially innermost cutting point NRI may also be coincident with a center point NC of the imaginary cutting profile PC.

In some embodiments of the present invention, the radial innermost cutting point NRI may be located axially forward of the radial outermost cutting point NRO.

As shown in FIGS. 2 to 4, the cutting-edge portion 48 may have an axially forwardmost cutting point NF located radially mid-way between the insert axis AI and the envelope surface 40 of the imaginary first cylinder C1.

For embodiments of the present invention in which the cutting insert 20 is of unitary one-piece construction and manufactured by form pressing and sintering a cemented carbide, it should be appreciated that several insert sizes of different cutting diameters DC may be advantageously produced from same-sized form-pressed green bodies, by applying a post-sintering process step, for example, grinding.

As shown in FIG. 2, the first insert plane PI1 may contain the entire cutting-edge portion 48.

In some embodiments of the present invention, the first insert plane PI1 may contain the entire first front edge 46.

Indeed, as seen in FIG. 2, no portion of the cutting insert 20 crosses the first insert plane (PI1). Thus, in some embodiments, the cutting insert 20 is entirely located in just the first and second quadrants Q1, Q2 described above.

Also, in some embodiments of the present invention, the first side surface 28 may be planar.

Further, in some embodiments of the present invention, the cutting insert 20 may be used for drilling operations, whereby radial support within a workpiece (not shown) is advantageously provided at least by the integrally formed first support surface 42.

It should be appreciated that the previously mentioned minute axial tapering of the imaginary first cylinder C1 in the rearward direction IR is particularly suitable for configurations of the cutting insert 20 used for drilling operations.

As shown in FIGS. 2, 5 and 6, a shoulder portion 54 may protrude from the second side surface 30.

In some embodiments of the present invention, the shoulder portion 54 may have a second support surface 56 contained in the envelope surface 40 of the imaginary first cylinder C1.

Also, in some embodiments of the present invention, the second support surface 56 may intersect the front surface 22.

As shown in FIG. 2, the second support surface 56 may be entirely located in a second imaginary quadrant Q2 adjacent to the first imaginary quadrant Q1 and separated therefrom by the second insert plane PI2.

For embodiments of the present invention having at least two integrally formed support surfaces, namely, the first and second support surfaces 42, 56 located in the adjacent first and secondary quadrants Q1, Q2, respectively, a high level of radial support within a drilled hole of the workpiece (not shown) is provided.

As shown in FIGS. 1, 2 and 5, the first land surface 32 may include a third support surface 58 contained in the envelope surface 40 of the imaginary first cylinder C1.

In some embodiments of the present invention, the third support surface 58 may circumferentially extend from the first land edge 36 in a direction opposite to the direction of cutting rotation RC.

Also, in some embodiments of the present invention, the third support surface 58 may intersect the front surface 22.

Further, in some embodiments of the present invention, the third support surface 58 may intersect the rear surface 24.

As shown in FIGS. 1, 2 and 5, the second support surface 56 may be spaced apart from the third support surface 58 by a second intermediate surface 60.

In some embodiments of the present invention, as shown in FIG. 2, the second intermediate surface 60 may be located radially inward of the envelope surface 40 of the imaginary first cylinder C1.

Also, in some embodiments, the shoulder portion 54 may be joined to the first land surface 32 via the second intermediate surface 60.

Further, in some embodiments of the present invention, the second intermediate surface 60 may be planar.

As shown in FIG. 2, for embodiments of the present invention including the third support surface 58, the third support surface 58 may be entirely located in the second imaginary quadrant Q2.

For embodiments of the present invention having three integrally formed support surfaces, namely, the first, second and third support surfaces 42, 56, 58, located in the first and second imaginary quadrants Q1, Q2, such that the two imaginary quadrants Q3, Q4 located on the opposite side of the first insert plane PI1 are devoid of support surfaces, sufficient lateral movement of the cutting insert 20 perpendicular to the insert axis AI may be enabled within the workpiece, such that the cutting insert 20 can be released from the workpiece without snagging.

As shown in FIGS. 2, 4, and 6, the shoulder portion 54 may include an abutting surface 62 facing away from the first land surface 32.

In some embodiments of the present invention, the abutting surface 62 may be located radially inward of the envelope surface 40 of the imaginary first cylinder C1, adjacent the second support surface 56.

Also, in some embodiments of the present invention, the abutting surface 62 may be located in the second imaginary quadrant Q2, facing the second insert plane PI2.

Further, in some embodiments of the present invention, the abutting surface 62 may be planar.

Yet further, in some embodiments of the present invention, the abutting surface 62 may be inclined at an abutment angle α1 of less than 10 degrees with the second insert plane PI2, when viewed along the insert axis AI.

In other embodiments of the present invention (not shown), the abutting surface 62 may be parallel to the second insert plane PI2.

A second aspect of the present invention relates to a rotary cutting tool 64 having a tool shank 66 extending along a shank axis AS defining a shank forward-rearward direction SF, SR, and the cutting insert 20 releasably secured to the tool shank 66.

As shown in FIGS. 7 to 12, the tool shank 66 has circumferentially spaced apart first and second protuberances 68, 70 protruding axially from a forward end portion 72 thereof, and the cutting insert 20 is located in an insert receiving slot 74 between the first and second protuberances 68, 70.

In some embodiments of the present invention, the tool shank 66 may include at least one coolant passage 75a, 75b axially extending through the first protuberance 68.

Figure 7:
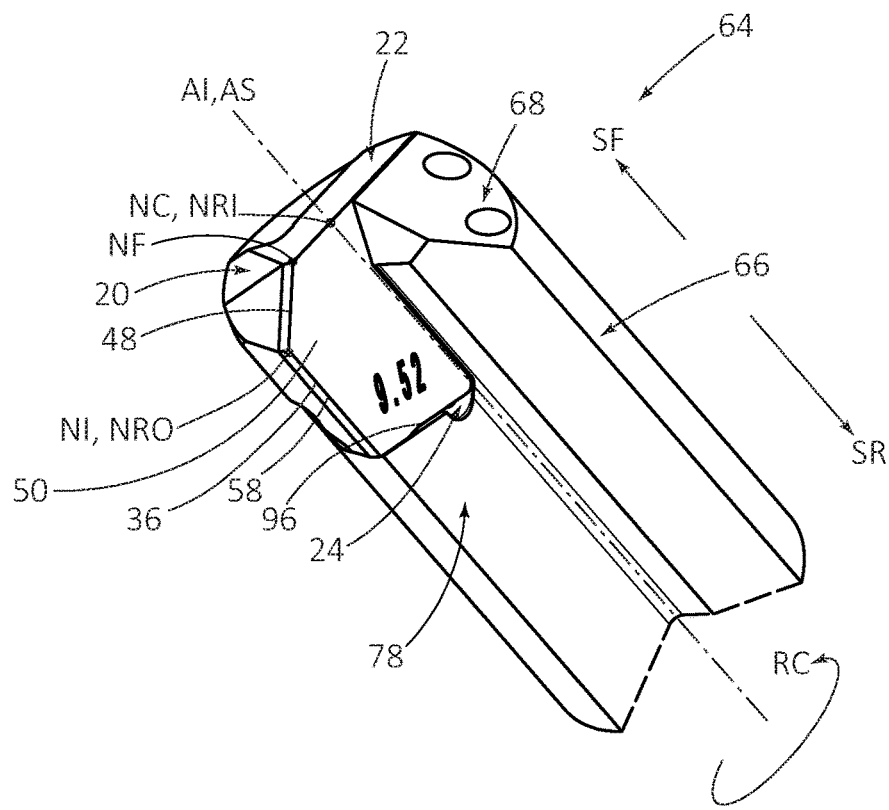
FIG. 7 is a first perspective view of a rotary cutting tool in accordance with some embodiments of the present invention.
Figure 8:
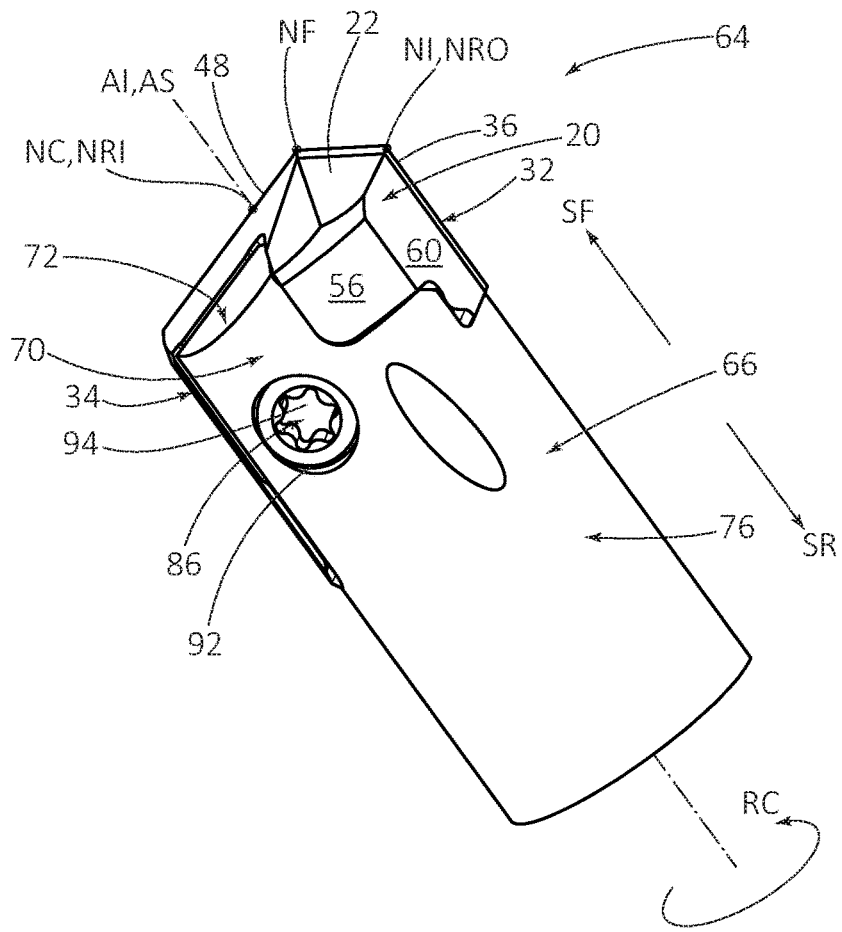
FIG. 8 is a second perspective view of the rotary cutting tool shown in FIG. 7.

As shown in FIGS. 7 and 8, the insert axis AI is coaxial with the shank axis AS, and the insert's front surface 22 faces in the shank forward direction SF.

It should be appreciated that, when retained in the tool shank 66, at least a portion of the insert's front surface 22 may be positioned axially forward of the first and second protuberances 68, 70 to an extent which allows regrinding of the front surface 22 and re-use of the cutting insert 20 following wear and/or damage of the original cutting-edge portion 48.

In some embodiments of the present invention, the tool shank 66 may have a generally cylindrical shank peripheral surface 76 with a shank diameter DS, and the shank diameter DS may be less than the first diameter D1.

Also, in some embodiments of the present invention, a shank flute 78 may be formed in the shank peripheral surface 76 extending rearwardly from the forward end portion 72.

Figure 11:
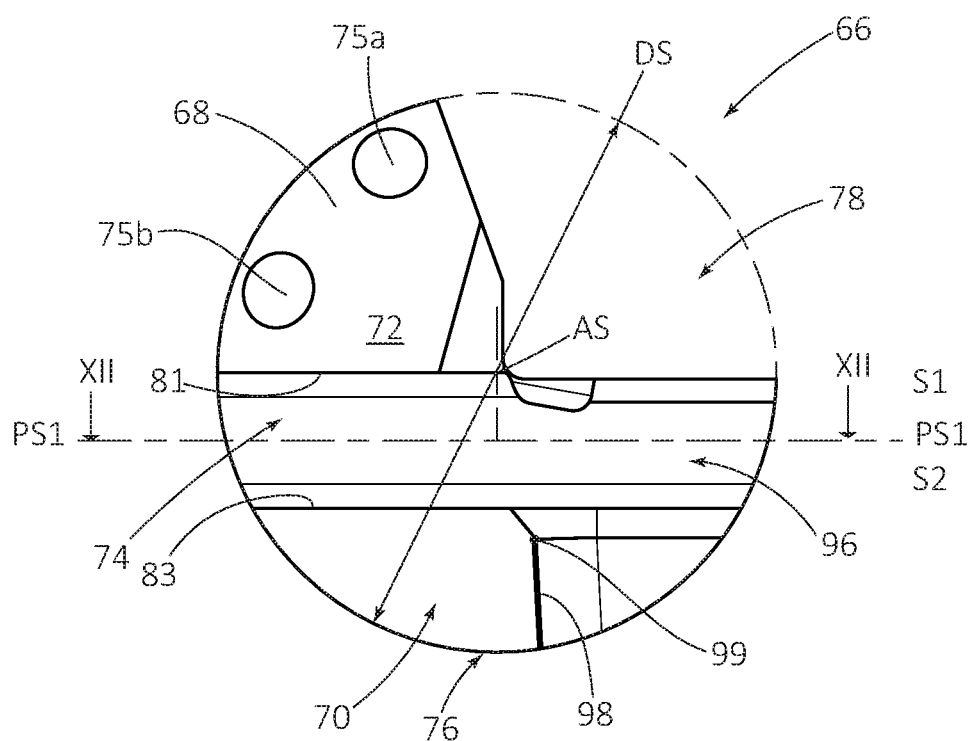
FIG. 11 is a forward end view of a tool shank of in accordance with some embodiments of the present invention.

As shown in FIG. 11, the shank flute 78 may be substantially V-shaped, when viewed along the shank axis AS.

Although not shown in the figures, it should be appreciated that the shank flute 78 may not extend along the entire axial length of the tool shank 66.

In some embodiments of the present invention, the rotary cutting tool 64 may be used for drilling operations.

Also, in some embodiments of the present invention, the rotary cutting tool 64 may be used for drilling holes of considerable depths relative to the cutting diameter DC, i.e. deep drilling, also called deep hole drilling.

It should be appreciated that by locating the cutting insert 20 in the insert receiving slot 74 between the axially forward protruding first and second protuberances 68, 70, there is no risk of the cutting insert 20 becoming inadvertently detached from the tool shank 66, during brief reverse rotation of the rotary cutting tool 64 in the workpiece, in contrast with the gun-drill of U.S. Pat. No. 7,393,162, mentioned above, in which the cutting head disclosed therein is detachably secured to the shank disclosed therein by relative rotation about a longitudinal axis of rotation.

As shown in FIGS. 1 to 3, the insert's first side surface 28 may include a first fixing surface 80 facing in the direction opposite to the direction of cutting rotation RC.

In some embodiments of the present invention, the first fixing surface 80 may intersect the second land surface 34.

Also, in some embodiments of the present invention, the first fixing surface 80 may be a planar sub-surface of the first side surface 28.

Figure 10:
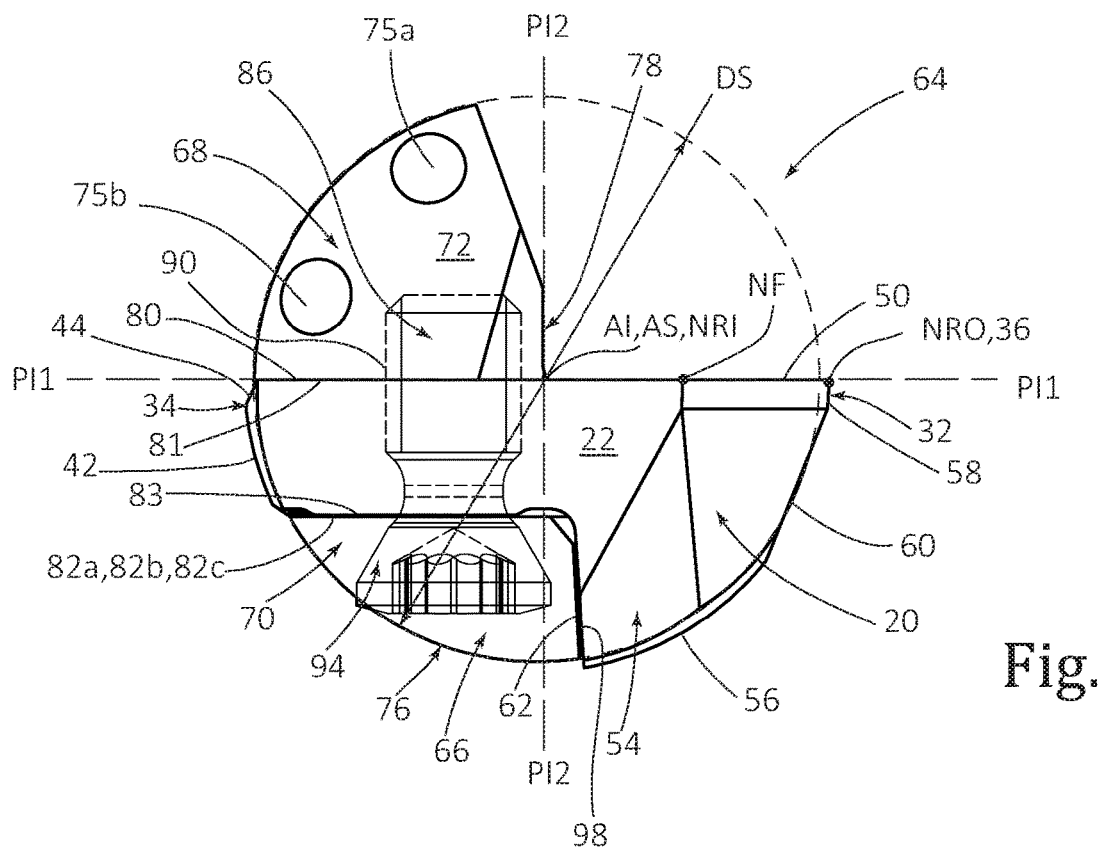
FIG. 10 is a forward end view of the rotary cutting tool shown in FIG. 7.

As shown in FIG. 10, a first clamping surface 81 of the first protuberance 68 may make contact with the first fixing surface 80.

As shown in FIG. 4, the insert's second side surface 30 may include three co-planar second fixing surfaces 82a, 82b, 82c, spaced apart from each other.

In some embodiments of the present invention, the three second fixing surfaces 82a, 82b, 82c may be parallel to the first fixing surface 80.

It should be appreciated that the provision of three co-planar second fixing surfaces 82a, 82b, 82c advantageously facilitates the manufacturing of the first fixing surface 80 parallel thereto.

As shown in FIG. 10, a second clamping surface 83 of the second protuberance 70 may make contact with at least one of the three second fixing surfaces 82a, 82b, 82c.

In some embodiments of the present invention, the second clamping surface 83 may face the first clamping surface 81.

As shown in FIGS. 3 and 4, an insert opening 84 may extend from the insert's first side surface 28 to the insert's second side surface 30.

In some embodiments of the present invention, the insert opening 84 may be asymmetrically located with respect to the insert axis AI.

Also, in some embodiments of the present invention, the insert opening 84 may extend to the rear surface 24. Thus, the insert opening 84 may open out to insert's first and second side surfaces 28, 30 and also to the insert's rear surface 24.

For embodiments of the present invention in which the insert opening 84 extends to the rear surface 24, the insert opening 84 may have an elongated slot shape.

Also, for embodiments of the present invention in which the insert opening 84 extends to the rear surface 24, the rear surface 24 may comprise two spaced apart rear sub-surfaces 24a, 24b.

In other embodiments of the present invention (not shown), the insert opening 84 may be in the form of an insert through bore, extending from the first side surface 28 to the second side surface 30.

Figure 9:
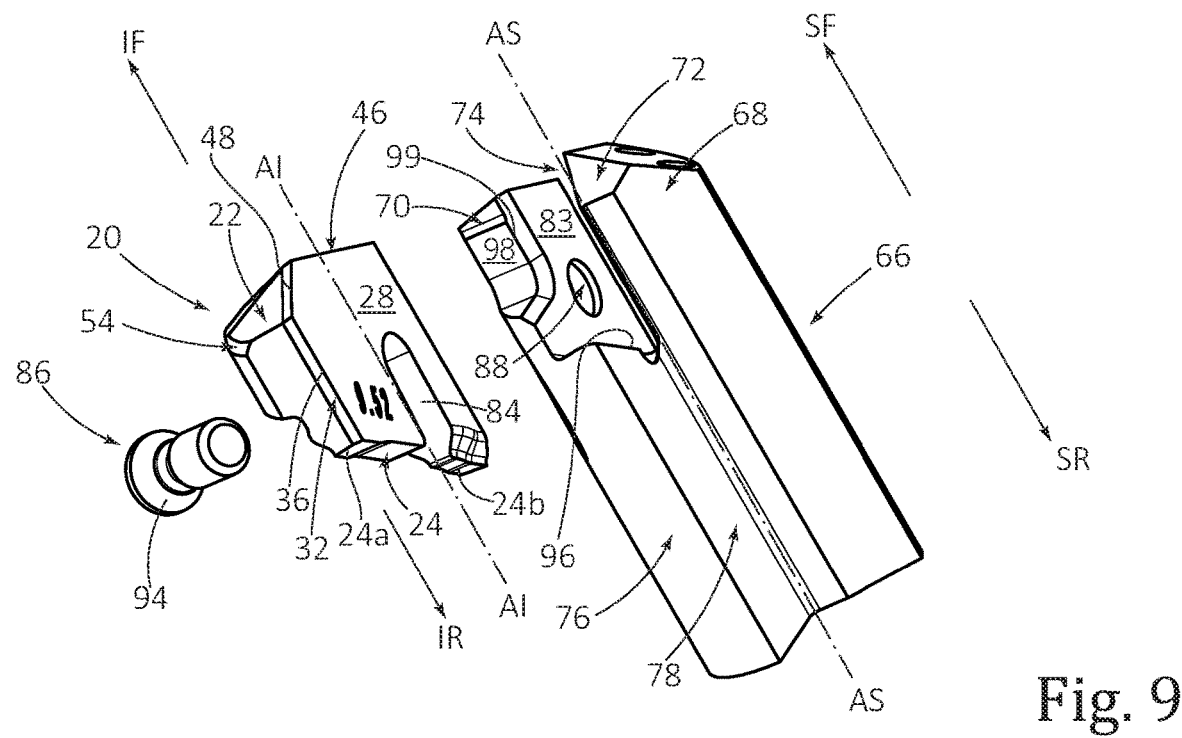
FIG. 9 is an exploded perspective view of the rotary cutting tool shown in FIG. 7.

As shown in FIGS. 8 to 10, a clamping bolt 86 may extend through the insert opening 84 and clamp the first and second protuberances 68, 70 against the insert's first and second side surfaces 28, 30, respectively.

In some embodiments of the present invention, the insert opening 84 may open out to the first fixing surface 80 of the insert's first side surface 28.

It should be appreciated that configuring the insert opening 84 to be asymmetrically located with respect to the insert axis AI, may advantageously reduce the risk of incorrectly assembling the rotary cutting tool 64.

In some embodiments of the present invention, the clamping bolt 86 may extend through a shank through bore 88 in the second protuberance 70 and threadingly engage a shank threaded bore 90 in the first protuberance 68.

It should be appreciated that for embodiments of the present invention in which the insert opening 84 extends to the rear surface 24, as opposed to being in the form of an insert through bore, the cutting insert 20 can be removed and replaced without disengaging the clamping bolt 86 from the shank threaded bore 90 in the first protuberance 68, but rather just by releasing the clamping force between the first and second protuberances 68, 70.

In some embodiments of the present invention, the second protuberance 70 may include a countersink hole 92 coaxial with the shank through bore 88 and opening out to the shank peripheral surface 86.

It should be appreciated that the countersink hole 92 may have a larger diameter than the shank through bore 88 to provide sufficient space for a bolt head 94 of the clamping bolt 86.

As shown in FIG. 7, the insert's rear surface 24 may make contact with a bottom surface 96 of the insert receiving slot 74.

For embodiments of the present invention in which the rear surface 24 comprises two spaced apart rear sub-surfaces 24a, 24b, two coplanar regions of the rear sub-surfaces 24a, 24b may make contact with the bottom surface 96 of the insert receiving slot 74.

In some embodiments of the present invention, the insert's rear surface 24 may be inclined in the insert rearward direction IR from the first land surface 32 to the second land surface 34.

For such embodiments of the present invention, in which the insert's rear surface 24 is inclined in the insert rearward direction IR from the first land surface 32 to the second land surface 34, the insert receiving slot's bottom surface 96 may be correspondingly inclined therewith.

It should be appreciated that configuring the insert's rear surface 24 to be inclined, may advantageously reduce the risk of incorrectly assembling the rotary cutting tool 64.

As shown in FIG. 10, the abutting surface 62 of the insert's shoulder portion 54 may make contact with an abutment wall 98 of the second protuberance 70.

It should be appreciated that during assembly of the rotary cutting tool 64, when the tool shank 66 is oriented in an 'upright' position, i.e. with the a shank forward direction SF against the direction of gravity, the inclination of the insert's rear surface 24 and the insert receiving slot's bottom surface 96 advantageously promotes contact between the abutting surface 62 and the abutment wall 98.

It should also be appreciated that the inclination of the insert's rear surface 24 and the insert receiving slot's bottom surface 96 may advantageously promote contact between the abutting surface 62 and the abutment wall 98 during use of the rotary cutting tool 64 in drilling operations.

In some embodiments of the present invention, it should be appreciated that due to manufacturing tolerances and inaccuracies, the abutting surface 62 may only make contact with a vertical edge 99 of the abutment wall 98.

Figure 12:
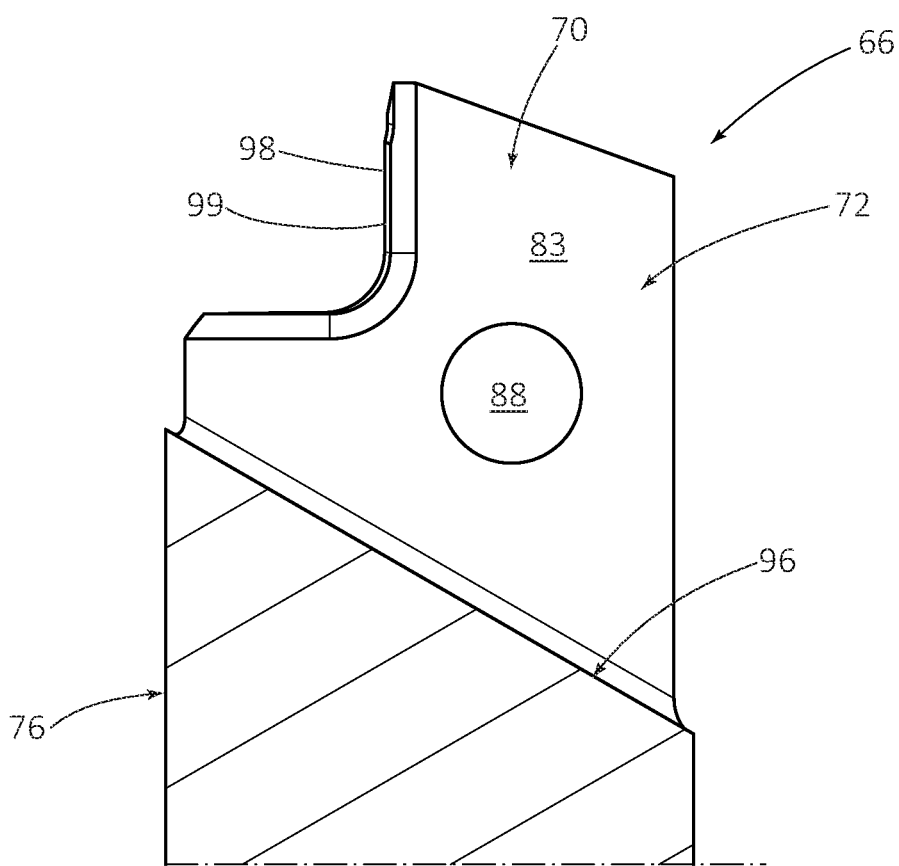
FIG. 12 is a cross-sectional view of the tool shank shown in FIG. 11, taken along the line XII-XII.

As shown in FIGS. 11 and 12, a first shank plane PS1 parallel to the shank axis AS bisects the insert receiving slot 74 along the slot's length, and the first and second protuberances 68, 70 are located on opposing first and second plane sides S1, S2, respectively, of the first shank plane PS1.

In some embodiments of the present invention, the shank flute 78 may be located on the first plane side S1 of the first shank plane PS1.

Also, in some embodiments of the present invention, the shank axis AS may be located on the first plane side S1 of the first shank plane PS1.

Further, in some embodiments of the present invention, the first insert plane PI1 may be parallel to and offset from the first shank plane PS1.

Yet further, in some embodiments of the present invention, the shank flute 78 may communicate with the insert receiving slot 74.

Although the present invention has been described to a certain degree of particularity, it should be understood that various alterations and modifications could be made without departing from the spirit or scope of the invention as hereinafter claimed.

What is claimed is:

1. A rotationally asymmetric cutting insert (20) rotatable about an insert axis (AI) in a direction of cutting rotation (RC), the insert axis (AI) defining an insert forward-rearward direction (IF, IR), the cutting insert (20) comprising;
   opposing front and rear surfaces (22, 24) interconnected by an insert peripheral surface (26), the insert peripheral surface (26) having first and second side surfaces (28, 30) spaced apart by first and second land surfaces (32, 34),
   a first land edge (36) formed at the intersection of the first side surface (28) and the first land surface (32) and extending rearwardly from a first end point (N1) located on the front surface (22), along the first land surface (32),
   a second land edge (38) formed at the intersection of the second side surface (30) and the second land surface (34) and extending rearwardly from the front surface (22) along the second land surface (34);
   a first front edge (46) formed at the intersection of the front surface (22) and the first side surface (28), the first front edge (46) including a cutting-edge portion (48) which extends radially outward to the first land edge (36); and
   a second front edge (52) formed at the intersection of the front surface (22) and the second side surface (30), the second front edge (52) being devoid of a cutting-edge portion,
   a first insert plane (PI1) containing the insert axis (A1) and the first end point (N1);
   a second insert plane (PI2) perpendicular to the first insert plane (PI1) and also containing the insert axis (A1), the second insert plane (PI2) intersecting the first insert plane (PI1) to thereby form first, second third and fourth imaginary quadrants (Q1, Q2, Q3, Q4);
   wherein:
   the first side surface (28) includes a rake surface (50) adjacent the cutting-edge portion (48), the rake surface (50) facing in the direction of cutting rotation (RC);
   the first and second land edges (36, 38) are contained in an envelope surface (40) of an imaginary first cylinder (C1) having a circular cross-section and a cylinder axis (AC) coaxial with the insert axis (AI), the imaginary first cylinder (C1) having a first diameter (D1),
   an imaginary cutting profile (PC) formed by rotating the cutting-edge portion (48) 360 degrees about the insert axis (AI) is located axially forward of the second front edge (52) and defines a cutting diameter (DC) which corresponds to the first diameter (D1),
   the second land surface (34) includes a first support surface (42) contained in the envelope surface (40) of the imaginary first cylinder (C1), and
   in a front view of the cutting insert (20), the first support surface (42) is entirely located in the first imaginary quadrant (Q1).

2. The cutting insert (20) according to claim 1, wherein the imaginary cutting profile (PC) is located axially forward of any edge associated with the front surface (22), apart from the cutting-edge portion (48).

3. The cutting insert (20) according to claim 1, wherein the first land edge (36) is straight and parallel to the insert axis (AI).

4. The cutting insert (20) according to claim 1, wherein the cutting-edge portion (48) extends radially outwardly from the insert axis (AI).

5. The cutting insert (20) according to claim 1, wherein the entire cutting-edge portion (48) is contained in the first insert plane (PI1).

6. The cutting insert (20) according to claim 1, wherein:
a shoulder portion (54) protrudes from the second side surface (30), and
the shoulder portion (54) has a second support surface (56) contained in the envelope surface (40) of the imaginary first cylinder (C1).

7. The cutting insert (20) according to claim 6, wherein:
the second support surface (56) is entirely located in a second imaginary quadrant (Q2) circumferentially adjacent to the first imaginary quadrant (Q1) and separated therefrom by the second insert plane (PI2).

8. The cutting insert (20) according to claim 7, wherein:
the first land surface (32) includes a third support surface (58) contained in the envelope surface (40) of the imaginary first cylinder (C1), and
the third support surface (58) is entirely located in the second imaginary quadrant (Q2).

9. The cutting insert (20) according to claim 1, wherein the cutting-edge portion (48) has an axially forwardmost cutting point (NF) located radially mid-way between the insert axis (AI) and the envelope surface (40) of the imaginary first cylinder (C1).

10. The cutting insert (20) according to claim 1, wherein an insert opening (84) extends from the first side surface (28) to the second side surface (30).

11. The cutting insert (20) according to claim 10, wherein the insert opening (84) is asymmetrically located with respect to the insert axis (AI).

12. The cutting insert (20) according to claim 1, wherein:
the first support surface (42) circumferentially extends from the second land edge (38) in a direction opposite to the direction of cutting rotation (RC).

13. A rotary cutting tool (64) comprising:
a tool shank (66) extending along a shank axis (AS) defining a shank forward-rearward direction (SF, SR), the tool shank (66) comprising circumferentially spaced apart first and second protuberances (68, 70) protruding axially from a forward end portion (72) thereof and an insert receiving slot (74) located between the first and second protuberances (68, 70); and
a rotationally asymmetric cutting insert (20) rotatable about an insert axis (AI) in a direction of cutting rotation (RC), the insert axis (AI) defining an insert forward-rearward direction (IF, IR), the cutting insert (20) comprising;
opposing front and rear surfaces (22, 24) interconnected by an insert peripheral surface (26), the insert peripheral surface (26) having first and second side surfaces (28, 30) spaced apart by first and second land surfaces (32, 34),
a first land edge (36) extending rearwardly from the front surface (22) along the first land surface (32),
a second land edge (38) extending rearwardly from the front surface (22) along the second land surface (34);
a first front edge (46) formed at the intersection of the front surface (22) and the first side surface (28), the first front edge (46) including a radially extending cutting-edge portion (48); and
a second front edge (52) formed at the intersection of the front surface (22) and the second side surface (30), the second front edge (52) being devoid of a cutting-edge portion,
wherein:
the first side surface (28) includes a rake surface (50) adjacent the cutting-edge portion (48), the rake surface (50) facing in the direction of cutting rotation (RC);
the first and second land edges (36, 38) are contained in an envelope surface (40) of an imaginary first cylinder (C1) having a circular cross-section and a cylinder axis (AC) coaxial with the insert axis (AI), the imaginary first cylinder (C1) having a first diameter (D1), and
an imaginary cutting profile (PC) formed by rotating the cutting-edge portion (48) 360 degrees about the insert axis (AI) is located axially forward of the second front edge (52) and defines a cutting diameter (DC) which corresponds to the first diameter (D1);
wherein:
the cutting insert (20) is releasably secured to the tool shank (66) in the insert receiving slot (74);
the insert axis (AI) is coaxial with the shank axis (AS); and
the insert's front surface (22) faces in the shank forward direction (SF).

14. The rotary cutting tool (64) according to claim 13, wherein:
the tool shank (66) has a generally cylindrical shank peripheral surface (76) with a shank diameter (DS) less than the first diameter (D1), and
a shank flute (78) is formed in the shank peripheral surface (76) extending rearwardly from the forward end portion (72).

15. The rotary cutting tool (64) according to claim 13, wherein:
the cutting insert (20) has an insert opening (84) extending from the insert's first side surface (28) to the insert's second side surface (30), and
a clamping bolt (86) extends through the insert opening (84) and clamps the first and second protuberances (68, 70) against the insert's first and second side surfaces (28, 30), respectively.

16. The rotary cutting tool (64) according to claim 13, wherein:
the insert receiving slot (74) has a bottom surface (96),
the insert's rear surface (24) makes contact with the insert receiving slot's bottom surface (96),
the insert's rear surface (24) is inclined in the insert rearward direction (IR) from the first land surface (32) to the second land surface (34), and
the insert receiving slot's bottom surface (96) is correspondingly inclined with the insert's rear surface (24).

17. The rotary cutting tool (64) according to claim 13, wherein:
the shank's second protuberance (70) has an abutment wall (98),
the cutting insert (20) has a shoulder portion (54) protruding from the second side surface (30), the shoulder portion (54) including an abutting surface (62) facing away from the first land surface (32), and
the abutting surface (62) makes contact with an abutment wall (98) of the second protuberance (70).

18. The rotary cutting tool (64) according to claim 13, wherein:
the shank's first protuberance (68) has a first clamping surface (81),
the insert's first side surface (30) includes a first fixing surface (80) facing in a direction opposite to the direction of cutting rotation (RC), and
the first clamping surface (81) of the first protuberance (68) makes contact with the first fixing surface (80).

19. The rotary cutting tool (64) according to claim 18, wherein:
the shank's second protuberance (70) has a second clamping surface (83),
the insert's second side surface (30) includes three coplanar second fixing surfaces (82a, 82b, 82c), and
the second clamping surface (83) of the second protuberance (70) makes contact with at least one of the three second fixing surfaces (82a, 82b, 82c).

20. The rotary cutting tool (64) according to claim 19, wherein the three second fixing surfaces (82a, 82b, 82c) are parallel to the first fixing surface (80).

21. The rotary cutting tool (64) according to claim 13, wherein:
the tool shank (66) includes at least one coolant passage (75a, 75b) axially extending through the first protuberance (68).

22. The rotary cutting tool (64) according to claim 13, wherein:
a first shank plane (PS1) parallel to the shank axis (AS) bisects the insert receiving slot (74) along the slot's length, and
the first and second protuberances (68, 70) are located on opposing first and second sides (S1, S2), respectively, of the first shank plane (PS1).

23. A rotationally asymmetric cutting insert (20) rotatable about an insert axis (AI) in a direction of cutting rotation (RC), the insert axis (AI) defining an insert forward-rearward direction (IF, IR), the cutting insert (20) comprising;
opposing front and rear surfaces (22, 24) interconnected by an insert peripheral surface (26), the insert peripheral surface (26) having first and second side surfaces (28, 30) spaced apart by first and second land surfaces (32, 34),
a first land edge (36) extending rearwardly from the front surface (22) along the first land surface (32),
a second land edge (38) extending rearwardly from the front surface (22) along the second land surface (34);
a first front edge (46) formed at the intersection of the front surface (22) and the first side surface (28), the first front edge (46) including a radially extending cutting-edge portion (48) extending radially outwardly to the first land edge (38); and
a second front edge (52) formed at the intersection of the front surface (22) and the second side surface (30), the second front edge (52) being devoid of a cutting-edge portion,
wherein:
the first side surface (28) includes a rake surface (50) adjacent the cutting-edge portion (48), the rake surface (50) facing in the direction of cutting rotation (RC);
the first and second land edges (36, 38) are contained in an envelope surface (40) of an imaginary first cylinder (C1) having a circular cross-section and a cylinder axis (AC) coaxial with the insert axis (AI), the imaginary first cylinder (C1) having a first diameter (D1);
an imaginary cutting profile (PC) formed by rotating the cutting-edge portion (48) 360 degrees about the insert axis (AI) is located axially forward of the second front edge (52) and defines a cutting diameter (DC) which corresponds to the first diameter (D1),
the first land edge (36) extends rearwardly from a first end point (N1),
the first end point (N1) and the insert axis (AI) are contained in a first insert plane (PI1), and
no portion of the cutting insert (20) crosses the first insert plane (PI1).

24. The cutting insert (20) according to claim 23, further comprising:
a second support surface (56) contained in the envelope surface (40) of the imaginary first cylinder (C1), the second support surface (56) being entirely located in a second imaginary quadrant (Q2) circumferentially adjacent to the first imaginary quadrant (Q1) and separated therefrom by the second insert plane (PI2); and
a third support surface (58) formed on the first land surface (32), the third support surface (58) also being contained in the envelope surface (40) of the imaginary first cylinder (C1) and also being entirely located in the second imaginary quadrant (Q2).

* * * * *